United States Patent [19]

Dalton et al.

[11] 4,064,093

[45] Dec. 20, 1977

[54] PROCESS FOR PREPARING GRAFTED RUBBER LATICES FREE OF COAGULUM

[75] Inventors: William O. Dalton, Hampden, Mass.; Glenn B. Hilton, Enfield, Conn.

[73] Assignee: Monsanto Company, St. Louis, Mo.

[21] Appl. No.: 725,910

[22] Filed: Sept. 22, 1976

[51] Int. Cl.$^2$ .............................................. C08L 51/04
[52] U.S. Cl. ..................... 260/29.7 PT; 260/29.7 UP; 260/880 R; 260/DIG. 22
[58] Field of Search .................... 260/880 R, 29.7 PT, 260/29.7 UP, DIG. 22

[56] References Cited

U.S. PATENT DOCUMENTS

| | | | |
|---|---|---|---|
| 3,509,237 | 4/1970 | Aubry | 260/880 R |
| 3,509,238 | 4/1970 | Aubry et al. | 260/880 R |
| 3,558,541 | 1/1971 | Dalton | 260/880 R |
| 3,957,912 | 5/1976 | Cincera | 260/880 R |

*Primary Examiner*—Eugene C. Rzucidlo
*Attorney, Agent, or Firm*—Joseph S. Nelson; William J. Farrington; James C. Logomasini

[57] ABSTRACT

There is disclosed a process for preparing a latex comprising grafted rubber particles for ABS polyblends that is free of coagulum, the steps comprising, preparing said latex and passing it through a porous filter bed means comprising agglomerated particles of said latex, removing said coagulum and producing a filtered latex. The process also includes the steps of blending said latex with a matrix polymer latex to form a mixed latex and coagulating said mixed latex and recovering said grafted rubber particles and matrix polymer as an ABS polyblend.

19 Claims, No Drawings

PROCESS FOR PREPARING GRAFTED RUBBER LATICES FREE OF COAGULUM

BACKGROUND OF THE INVENTION

Processes for preparing ABS polyblends are known in the art. Such processes include the mass, mass/suspension and emulsion polymerization of prepolymerized rubber with monomer formulations of styrene and acrylonitrile monomers. Emulsion polymerization is often preferred because larger percentages of rubber may be grafted and incorporated in the polyblend. U.S. Pat. No. 3,509,237 disclosed mass/suspension and emulsion polymerization processes for preparing ABS polyblends. U.S. Pat. No. 3,957,912 discloses a mass process for preparing ABS polyblends based on emulsion grafted rubbers.

The emulsion polymerization of a prepolymerized rubber with said monomer formulation in aqueous emulsion provides a latex comprising grafted rubber particles, said particles having an average diameter in the range of 0.005 to 2.0 microns. As those skilled in the art realize, such latices can contain a certain amount of coagulum which can be ungrafted rubber that agglomerates to large particles or polymeric scale from the reactor that can be deposited at high shear areas in the reactor and flake off into the latex. Such materials, called coagulum, are generally removed from the latex by some form of low shear filtration before the latex is processed further to form a polyblend. If such coagulum is allowed to remain in the latex and is carried onto the final polyblend, such coagulum will cause hard spots in the final ABS formed parts.

The filtering of such latices through tightly woven cloth filters will remove such coagulum, however, such filtering means blind quickly and are not practical commercially. Filter beds of sand have been used, however, any filter-bed sand contamination coming through into the final product is unacceptable. Fine screens have been used but high shear through such screens, which blind readily, produces additional coagulum.

It is the objective of the present invention to provide a process that will prepare said grafted rubber latices free of such coagulum by passing said latices through a novel porous filter bed means comprising agglomerated particles of said latex as a filter bed medium. It has been found that the agglomerated particles form a crumb with a particle size distribution that in bed form has a large number of pores and interstices and provides a very efficient filtering medium for removing coagulum and passing the aqueous latex containing the small grafted rubber particles. The novel filtering medium has been found to have the additional advantage that the filter medium does not contaminate the product if it passes through into the filtered latex as it is indistinguishable from the final product having the same composition as the grafted rubber particles.

SUMMARY OF THE INVENTION

It has now been found that the foregoing and related objectives may be readily obtained in the present process which is a process for preparing a latex comprising grafted rubber particles for ABS polyblends that is free of coagulum, the steps comprising:

A. polymerizing a polymerization mixture containing a monomer formulation and prepolymerized graftable rubber particles containing a diene monomer component to graft at least a portion of the polymerizing monomers as a superstrate interpolymer upon said rubber particles to provide said grafted rubber particles, said monomer formulation comprising a monovinylidene aromatic monomer and an ethylenically unsaturated nitrile monomer, said polymerizing being carried out in an aqueous emulsion such that said grafted rubber particles are contained in said latex, B. coagulating a portion of said latex as agglomerated particles comprising said grafted rubber particles and separating said agglomerated particles from said latex, C. preparing a porous filter bed means comprising said agglomerated particles, and D. passing said latex containing said grafted rubber particles through said filter bed means removing said coagulum and providing a filtered latex.

PREFERRED EMBODIMENTS

Interpolymers

The interpolymers of the present invention of both the matrix and the graft superstrates consist at least principally of a monovinylidene aromatic hydrocarbon and an unsaturated nitrile, i.e., such monomers comprise at least 50.0% by weight and preferably at least 75.0% by weight of the interpolymers. Most desirably, such monomers comprise at least 90.0% by weight of the interpolymer and the usual commercial compositions are substantially completely comprised of such monomers although minor amounts, i.e., less than 5.0% by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and, accordingly, it is desirable that the superstrates of the graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/or ratios may be desirable for some applications and that some deviations may inherently occur as the result of process variables.

Exemplary of the monovinylidene aromatic hydrocarbons which may be used in the interpolymers are styrene; alpha-alkyl monovinylidene monoaromatic compounds, e.g. alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed.

Exemplary of the unsaturated nitriles which may be used in the interpolymers are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1,3 dienes, e.g., butadiene, isoprene, etc.; alpha-or beta-unsaturated monobasic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monovinylidene aromatic hydrocarbon or interpolymer thereof.

The polymerizable monomer mixtures contain at least 20% by weight of the monovinylidene aromatic monomer and preferably at least 50% by weight thereof. They also contain at least 5% by weight of the unsaturated nitrile and preferably at least 10% by weight thereof. From the standpoint of highly advantageous commercial practice, the monomer formulations contain 20 to 95%, and preferably 60 to 85%, by weight of the vinylidene aromatic hydrocarbon and 80 to 5%, and preferably 40 to 15%, by weight of the unsaturated nitrile.

The Matrix

As is well known in the art, the polyblend is produced by polymerizing the monomers in the presence of the preformed rubber. It is believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100% grafting efficiency is not usually attainable, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass, suspension and emulsion or combinations thereof. Such techniques are well known and are also described herein with respect to the graft copolymerization reactions.

The Rubber Substrate

Various rubbers onto which the interpolymer may be grafted during the polymerization in the presence thereof are utilizable as the substrate of the graft copolymer including diene rubbers, polyisoprene rubbers, chloroprene rubbers and mixtures thereof as well as interpolymers thereof with each other or other copolymerizable monomers.

The preferred rubbers are diene rubbers or mixtures of diene rubbers, i.e., any rubbery polymers (a polymer having a second order transition temperature not higher than 0° centigrade, preferably not higher than −21° centigrade, as determined by ASTM Test D-746-52T) of one or more conjugated 1,3 dienes, e.g., butadiene, isoprene, piperylene, chloroprene, etc. Such rubbers include homopolymers of conjugated 1,3 dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylsytrene, etc; an alpha-alkylstyrene, such as alpha-methylstyrene, alpha-ethylstyrene, alpha-methyl-p-methylstyrene, etc; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pryidines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2% of a crosslinking agent, based on the weight of the rubber-forming monomer or monomers, crosslinking may present problems in dissolving the rubber in the monomers for the graft polymerization reaction, particularly for a mass of suspension polymerization reaction. In addition, excessive crosslinking can result in loss of the rubbery characteristics. The crosslinking agent can be any of the agents conventionally employed for crosslinking diene rubbers, e.g., divinylbenzene, diallyl maleate, diallyl fumarate diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75 to 100% by weight of butadiene and/or isoprene and up to 25% by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene.

Various techniques are customarily employed for polymerizing rubber monomers including mass, suspension and emulsion polymerization. Emulsion polymerization can be used to produce a latex emulsion which is useful as the base for emulsion polymerization of the graft copolymer.

Graft Polymerization Processes

The graft copolymers are prepared by polymerizing monomers of the interpolymer in the presence of the preformed rubber substrate, generally in accordance with conventional graft polymerization techniques involving emulsion polymerization. In such graft polymerization reactions, the preformed rubber substrate generally is dispersed in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 70–150:100. With graft ratios above 30:100, a highly desirable degree of improvement in various properties generally is obtained.

To minimize requirements for separate equipment, the same process of polymerization desirably may be utilized to prepare the rubber graft components, as well as ungrafted interpolymer or crystal for use as the matrix when required. Generally, the particle sizes of the graft copolymer can be varied by varying the size of the rubber substrate employed.

To some extent, crosslinking and the ratio of the superstrate to substrate in the graft copolymer tend to affect the particle size of the graft copolymers by reason of an apparent tendency for the particles to aggregate or agglomerate as the amount of grafting and/or crosslinking becomes minor.

The graft copolymer particles produced in various polymerization processes may be agglomerated through various techniques in the recovery thereof such as during the coagulation and/or dewatering techniques. Heat and other conditions of polymerization such as catalysts monomer ratios, rate of addition of monomers, etc., also tend to affect the particle size of the graft copolymers produced thereby.

However, different polymerization techniques may be utilized to produce the graft copolymer particles by reliance upon inherent process characteristics. In practice, it has been found desirable to utilize an emulsion polymerization process to form the graft particles. Generally, the graft copolymerization inherently produces crosslinking, and this may be enhanced by selection of process conditions to ensure discreteness of the graft copolymer particles.

It will be appreciated that both large and small particle graft copolymer components may be provided by mixtures of two or more separately formed graft copolymers of distinctive properties to vary still further the benefits of the present invention. For example, the small particle graft copolymer may be a cocoagulation of two different graft copolymer latices having different superstrate to substrate ratios.

Emulsion Polymerization Process

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and perazo catalysts and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates and percarbonates and hydrogen peroxide. If so desired, the catalysts may be activated to form redox systems. In addition, it may be advantageous to include an oil-soluble catalyst such as those hereinbefore identified for mass-emulsion polymerization processes. However, other free-radical generating catalysts may be employed such as actinic radiation.

Chain transfer agents and other polymerization modifiers may desirably be included and it is generally advantageous to incorporate a higher alkyl mercaptan, such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20° and 100° centrigrade with agitation. Pressures of 1 to 100 pounds per square inch may be employed and the monomers and/or additional catalyst may be added incrementally or continuously over a portion of the reaction cycle. Polymerization is continued until substantially all, i.e. more than 90% of the monomers have reacted. The remaining monomers and other volatile components are then distilled from the latex, which is then dewatered, washed and dried.

Particle size of the emulsion graft particles may be varied by seeding, emulsifying agent concentration and agitation. Agglomeration of particles may also be employed as disclosed in U.S. Pat. No. 3,558,541.

Grafted Rubber Particle Size

The emulsion prepolymerized rubber as polymerized generally has a small particle size, i.e., less than 0.2 microns in the range of about 0.005 to 0.2 microns. If larger particles are desired the emulsion can be partially destabilized with small amounts of an electrolyte as disclosed in U.S. Pat. No. 3,558,541 so that the particles will cluster or agglomerate to sizes ranging from about 0.2 to 2.0 microns, such clustered particles are still emulsified and are colloidally dispersed in the emulsion latex. They are not coagulated or agglomerated to a particle size that will separate physically from the latex and can be separated readily by known filtration or centrifugation processes as in step (B) of the present process. Generally, rubber particles larger than 2 micron are not preferred for grafting because of poor gloss. Coagulation provides agglomeration that range in size from about 40 to 4000 microns or larger that can be separated and used in the filter bed means.

During the grafting reaction, the rubber particles clustered and/or unclustered are grafted providing stable grafted particles that are colloidally dispersed in the emulsion latex providing grafted rubber particles of the size desired. Generally, the smaller the particles, the better the gloss the ABS polyblend will have as used in molded parts. The larger the particles the tougher the ABS polyblend will be. It is known to blend large and small grafted particles to optimize both gloss and toughness as disclosed in U.S. Pat. No. 3,509,238. Particle sizes of about 0.05 to 0.40 microns are used preferably about 0.1 to 0.3 microns.

The particle size of the rubber is expressed as a weight average particle size diameter in microns as determined by a photosedimentometer in the published procedure of Graves, M. J., et. al., British Chemical Engineering, 9:742-744 (1964). A Model 3000 Particle Size Analyzer was used supplied by the Martin Sweets Company, Louisville, Ky.

The amount of grafted interpolymer on the grafted rubber particles can be determined by known procedures. A suitable procedure is to recover the grafted rubber particles from the filtered latex by coagulation washing and drying. One gram of the coagulate is dispersed in a 50/50 acetone/methyl ethyl ketone solvent (10 ml) which dissolves any matrix interpolymer formed leaving the unsoluble grafted rubber particles dispersed. The grafted rubber particles are removed by centrifugation as a gel and dried in a vacuum oven at 50° C. for 12 hours to a dry gel and weighed.

$$\% \text{ dry gel} = \frac{\text{weight of dry gel}}{\text{weight of dry coagulate}} \times 100$$

$$\% \text{ graft} = \frac{\% \text{ dry gel} - \% \text{ rubber}}{\% \text{ rubber*}} \times 100$$

*% rubber, determined by infra red analysis of dry gel.

The coagulation step (B) is carried out by adding an electrolyte selected from the group consisting of acids, metal salts and acid anhydrides or mixtures thereof in amounts sufficient to break the emulsion and coagulate said grafted rubber particles. Acids, e.g., acetic, formic, propionic, acrylic, hydrochloric or sulfuric may be used. Metal salts, e.g., magnesium stearate, magnesium sulfate, sodium chloride, aluminum sulfate, aluminum nitrate, calcium nitrate, lead nitrate and lead sulfate may be used. Acid anhydrides, e.g., acetic anhydride, maleic anhydride and propionic acid anhydride have been used. Generally, 1 to 10% by weight electrolyte solutions are used.

Generally, the amount of electrolyte used to coagulate the latex will be at least an amount greater than the stoichiometric equivalent of the emulsifying agent contained in the emulsion or latex. Excessive amounts become more difficult to wash from the coagulated grafted rubber particles. As already indicated the grafted rubber particles agglomerate and coagulate as the emulsifying agent's ability to emulsify is destroyed by the electrolyte. The grafted rubber particles and the matrix interpolymer coagulate in the form of crumb that can be filtered or centrifuged from the aqueous phase of the emulsion. The crumb is then washed and dried. The coagulated crumb serves as a filter bed medium having interstices in bed form of at least about 1 micron. The crumb after coagulation, washing and drying is a free flowing powder which can be readily used as a filter bed medium in any conventional filter bed operations. The crumb can be used as coagulated or ground to finer size to provide interstices between the particles that will pass the grafted rubber particles ranging from 0.05 to 2.0 microns in size.

The latex of the grafted rubber particles containing interpolymer is generally blended with a latex of the interpolymer prepared by emulsion polymerization of the monomer formulation in amounts such that the polyblend will have the desired amount of grafted rubber to insure the toughness properties of the polyblend. The amounts of grafted rubber particles used in the polyblend are such that the grafted rubber particles comprise from about 2 to 70% by weight of the polyblend with the remaining up to 100% by weight being interpolymer.

The porous filter bed means preferably comprises a conduit having an open first orifice at one end for receiving said latex, a second orifice located at the opposite end of said conduit, said second orifice being a perforated member, said agglomerated particles being contained in said conduit and being positioned on said perforated member as a porous filter bed of sufficient depth to filter said coagulum from said latex passed through said porous filter bed. The porous filter bed means can be comprised of a basket filter, commonly used for filtering solids from aqueous phases, wherein the agglomerated grafted rubber particles, as coagulated in step (B), are positioned as a filter bed in said basket filter to such a depth as to cover the filter openings in the lower portion of said basket forming a filter bed medium for filtering said latices in step (C). Said porous filter bed means is comprised of said coagulated agglomerated rubber particles as a filter bed medium wherein the interstices between particles are sized to pass said latex rubber particles and retain said coagulum. The average diameter of said agglomerated particles are such that the particles are substantially retained on a screen having a mesh number of about 5 to 400 and openings of about 40 to 4000 microns.

The perforated member of the filter bed means can be a screen having a mesh number of about 5 to 400 and openings of about 40 to 4000 microns. Although screens are preferred such as stainless steel screens other perforated members can be used, e.g., filter baskets having openings ranging from about 0.40 mm to 4.0 mm or larger that will substantially retain the coagulated agglomerated crumb or beads. The latex can be passed through the filter bed means by gravity flow wherein the hydrostatic head is sufficient to provide practical flow rates for commercial operations. A negative pressure can be applied to the bottom screen orifice of the filter bed means as well such that practical commercial flows are realized. Such pressureized methods of filtering are adapted to step (D) such that practical commercial flows are realized consistent with pressure values that do not compact the filter bed medium to the extent that the interstices are closed sufficiently to create excessive back pressures and low filtering rates.

It has been found that the coagulum has a particle structure that will gather in the upper layers of the filter bed medium without blinding the filter bed medium providing additional filter bed medium under continuous usage. However, as its volume increases it must be removed periodically. Continous usage of the filter bed medium will gradually fill the interstices and the medium will have to be changed. It has been found that the filter bed medium can be washed and dried and compounded with additional matrix interpolymer to form ABS compounds that are acceptable for moldings or extrusion that do not require a high gloss but can have a high matte finish with excellent physical properties such as toughness, etc.

It has also been found that such filter bed mediums can be back washed readily as is commonly done in the use of such beds to reactivate the bed as a porous filter bed means.

The process may include the additional steps:

E. blending said filtered latex with a latex of a matrix interpolymer so as to form a mixed latex of said grafted rubber particles and said matrix interpolymer, F. coagulating said mixed latex and recovering said grafted rubber particles and said matrix interpolymer as an ABS polyblend.

As already disclosed, matrix phase interpolymer can be produced during the polymerization step (A) in amounts of 30 to 98% by weight of the polymerized interpolymer. Such a polymerized product is a latex containing grafted rubber particles grafted with superstrate interpolymer and emulsified interpolymer as a separate phase forming a latex of mixed polymers. Such latices can be processed through steps (B), (C) and (D) to provide filter latices which can be coagulated, washed and dried by conventional means to form ABS polyblends without further blending with an interpolymer latex as in step (E) and (F).

ABS polyblend can also be formed by the mass/suspension polymerization of said monomer formulation having a diene rubber dissolved therein as disclosed in U.S. Pat. No. 3,509,237. The ABS polymer is recovered as beads of ABS polyblend. The particle size of said beads can be varied depending on agitation and the amount of suspending agent used. Such beads can be used as the filter bed medium in the filter bed means. The beads can be formed in sizes ranging from about 0.20 mm to 2.0 mm and may be used as such as mixed to provide a porous filter bed medium having interstices that will effectively filter the coagulum from said latices. The bead filter bed medium has the advantage of having about the same composition as the latex to be filtered, hence, does not contaminate the latex if any of the filter bed medium passes through with the latex. Such filter bed mediums are readily backwashed by conventional means or can be removed and polyblended with high matte finish compounds providing an economical filter bed means.

Flow rates for filtering operations are usually about 1 to 10 gpm./ft$^2$ (2 to 20 cu.ft./sec.) of filter bed under pressures of 1 to 25 psi (703 to 17,500 kgs/m$^2$).

The filter bed medium depth varies depending on the rate of filtering desired. Faster rates require deeper beds to insure retention of coagulum. Generally, the bed will be filled 50 to 75% of the vessel volume as positioned on the perforated orifice or orifices if a plurality is used. Simple experimentation with small beds of certain areas and depths can be used to determine rates versus feed pressure and pressure drops through the bed and ultimate life of the bed which can be scaled directly to larger bed for commercial operations. Generally, filter bed depths of 6 to 24 inches (15-600 cm) of coagulate rubber particles as crumb are used so that the back pressure of the filter bed are not excessive.

EXAMPLE 1

To a 250.0 parts of a latex of butadiene/acrylonitrile copolymer (93:7) containing 50.0% solids and approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulent was then washed and dried. The resulting graft copolymer has a superstrate to substrate ratio of about 0.9:1.0 and a particle size (number average) of about 0.14 micron.

A portion of the latex was coagulated with a 10% magnesium sulfate solution, washed and dried to form a crumb of said grafted rubber particles. A screen analysis of the crumb showed the particle size to vary from about 0.12 to 5.0 (125-5000 microns) mm. with substantially all particles retainable on an 80 mesh screen.

The latex above contained about 39% solids of which about 41.3% by weight is rubber, 33.0% by weight is graft interpolymer and 25.7% by weight is interpolymer. The total graft rubber phase being about 74.3% by weight of the solids.

EXAMPLE 2

The crumb of coagulated particles of Example 1 was placed in a filter bed means comprising a vertically oriented cylinderical conduit about 1.6 inches in diameter (4.06 cm) and 10 inches (25.4 cm) long having a first open orifice and a 80 mesh screen as a second orifice at the opposite lower end. The loosely packed crumb filled the lower 4 inches (10 cm) of the conduit as a filter bed medium. About 2000 ml of the latex of Example 1 was filtered by gravity through the porous filter bed means over a period of 20 minutes the flow rate varied from 148 ml/min. at the start to 62 ml/min. at the end. The filtered latex was coagulated, washed and dried to a crumb and extruded through a 1 inch (2.54 cm) extruder at 250° C. into (2.54 cm by 30 mm) strips and the hard spots per 6.5 cm$^2$ were counted as visible defects. The number of hard spots were found to average about 2.4. The unfiltered latex of Example 1 was coagulated, washed and dried and extruded into strips. The hard spot count was found to average about 11.4. The hard spots were reduced about 82.5%.

EXAMPLE 3

Example 2 was repeated using crumb retained on a 60 mesh screen as the filter bed medium and the hard spot count was found to be 2.9. The hard spot count was reduced about 75%.

EXAMPLE 4

The filter bed medium of Example 2 after having been used as a filter bed was dried and extruded in strips and the hard spot count was found to be about 15.8. The filter bed medium of Example 3 was dried and extruded into strips and found to have a hard spot count of 12.0. It is evident that the filter bed medium is filtering off coagulum which produces hard spots retaining them in the filter bed medium.

EXAMPLE 5

Scale-up runs were made with a pressurized cylindrical filter bed means having a diameter of 6 feet (183 cm) and a depth of about 3 feet (91.5 cm) about 67% filled with coagulated, washed and dried crumb of Example 1 to a depth of 2 feet (61 cm). The bottom orifice was an interconnected supported 60 mesh screen. Flow rates of the latex through the filter bed means was 37 gal/min. (2.22 l/sec.) with a pressure drop across said means of about 7.5 psi (5260 kgs/m$^2$) operating at about 25 psi (17,500 kgs/m$^3$). The filtered latex was coagulated, washed and dried and tested. The hard spot count was found to be about 2.6 showing that large volume filtration was effective in reducing coagulum and hard spot material.

Filter bed means and filtration have been described in detail in the reference "Physiochemical Processes For Water Quality Control", Walter J. Weber, Jr., Wiley-Interscience, New York, New York. In general the filter bed means are closed water-tight cylindrical vessels, tanks or column operated in a vertical or horizontal position. The latex enters and leaves the vessel under pressure and are known generally as pressure filters (available from Permutit Company, Paramus, New Jersey). Gravity or vacuum filters operate under the same principles as pressure filters and may be adapted as filter bed means.

In general, the filter bed means are operated in a vertical position with flow from top to bottom to avoid channelling and uneven distribution. Depths of the vessels usually range from 2 feet to 6 feet (60 to 180 cm) or larger. About 50 to 100% of the filter bed medium height is provided in the top section of the vessel as free space for expansion during backwashing. The filter bed means varies in diameter with the larger the diameter the greater volume of flow that can be filtered. Hence, the diameter is dependent on the volume of latex to be processed and can be 2 to 6 feet in diameter (60 to 180 cm) or larger.

What is claimed is:

1. In a process for filtering coagulum from a latex comprising grafted rubber particles for ABS polyblends wherein said latex is passed through a filter bed medium, the improvement comprising:
   coagulating a portion of said latex as agglomerated particles comprising said grafted rubber particles, and separating said agglomerated particles from said latex,
   preparing a porous filter bed means comprising said particles wherein said particles have a particle size such that the interstices between said particles are sized to pass said latex rubber particles and retain said coagulum, and
   passing said latex containing said grafted rubber particles through said filter bed means removing said coagulum and providing a filtered latex.

2. A process of claim 1 wherein said latex is prepared by polymerizing a polymerization mixture containing a monomer formulation and prepolymerized graftable rubber particles containing a diene monomer component to graft at least a portion of the polymerizing monomers as a superstrate interpolymer upon said rubber particles to provide said grafted rubber particles, said monomer formulation comprising a monovinylidene aromatic monomer and an ethylenically unsaturated nitrile monomer, said polymerizing being carried out in an aqueous emulsion such that said grafted rubber particles are contained in said latex, said grafted rubber particles have a rubber substrate containing a diene monomer and a superstrate of said interpolymer comprised of said monomers, said grafted rubber particles having a superstrate to substrate ratio of 10-250 to 100 and having an average particle size of 0.005 to 3.0 microns.

3. A process of claim 2 wherein said monovinylidene aromatic monomer of said monomer formulations is styrene.

4. A process of claim 2 wherein said unsaturated nitrile of said monomer formulations is acrylonitrile.

5. A process of claim 2 wherein said rubber of said mixture is selected from the group consisting of diene rubber polymers containing at least 75.0% by weight of a conjugated 1,3-diene rubber forming monomer.

6. A process of claim 2 wherein said monovinylidene aromatic monomer and unsaturated nitrile monomer comprise at least 75.0% by weight of the monomer formulations of said mixture.

7. A process of claim 1 wherein said coagulation is carried out by adding an electrolyte selected from the group consisting of acids, metal salts and acid anhydrides or mixtures thereof to said latex in amounts sufficient to coagulate said grafted rubber particles.

8. A process of claim 7 wherein said electrolyte is magnesium sulfate.

9. A process of claim 1 wherein said process includes steps of
   blending said filtered latex with a latex of a matrix interpolymer so as to form a mixed latex of said grafted rubber particles and said matrix interpolymer,
   coagulating said mixed latex and recovering said grafted rubber particles and said matrix interpolymer as an ABS polyblend.

10. A process of claim 9 wherein said grafted rubber particles comprise about 2 to 70% by weight of said polyblend.

11. A process of claim 2 wherein said monovinylidene aromatic monomer of said monomer formulation is styrene and wherein said unsaturated nitrile monomer of said formulations is acrylonitrile and wherein said styrene and acrylonitrile comprise at least 75% by weight of said superstrate interpolymers of said grafted rubber particles.

12. A process of claim 9 wherein said matrix interpolymer is comprised of said monovinylidene aromatic monomer and said ethylenically unsaturated acrylonitrile monomer.

13. A process of claim 1 wherein said agglomerated rubber particles are of a diameter that are substantially retained on a screen having a mesh number of 40 to 400 and openings of 37 to 420 microns.

14. A process of claim 1 wherein said porous filter bed means comprises a vessel having an open first orifice at one end for receiving said latex, at least one additional orifice located at the opposite end of said vessel, said additional orifice being a perforated member, said agglomerated particles being contained in said conduit and being positioned on said perforated member as a porous filter bed of sufficient depth to filter said coagulum from said latex passed through said porous filter bed.

15. A process of claim 14 wherein said perforated member is a screen having a mesh number of about 40 to 400 and openings of about 37 to 420 microns.

16. A process of claim 1 wherein said latex is passed through said porous filter bed means under a pressure of about 700 to 17,500 kgs/m².

17. A process of claim 1 wherein said interstices are at least about 2 microns.

18. A process of claim 1 comprising step (A) is followed by steps (C) and (D) wherein said filter bed means comprises beads of an ABS polyblend.

19. A process of claim 1 wherein said process includes: coagulating said filtered latex and recovering a crumb comprising said grafted rubber particles as an ABS polyblend.

* * * * *